UNITED STATES PATENT OFFICE.

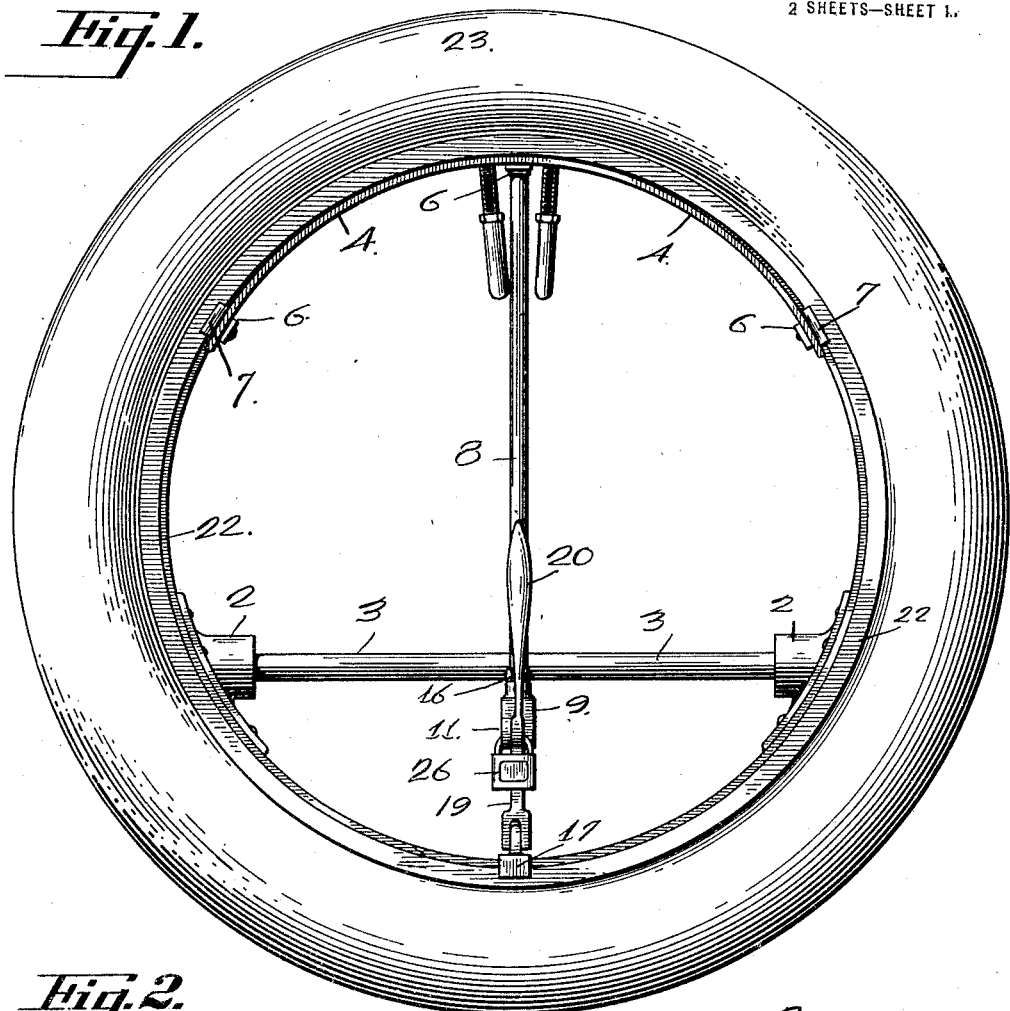
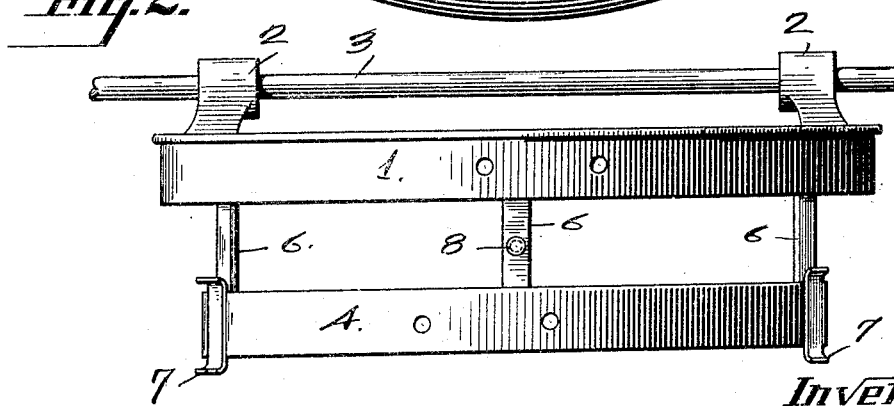

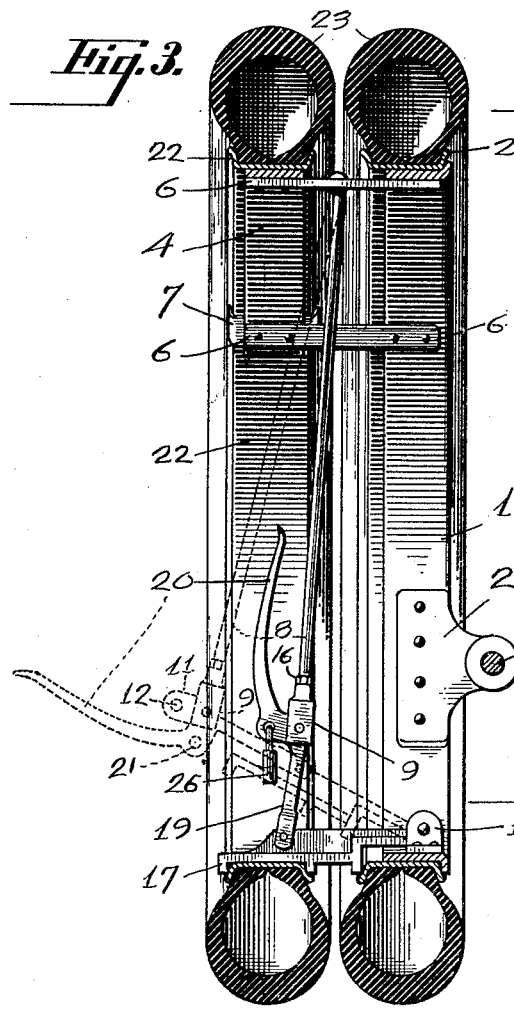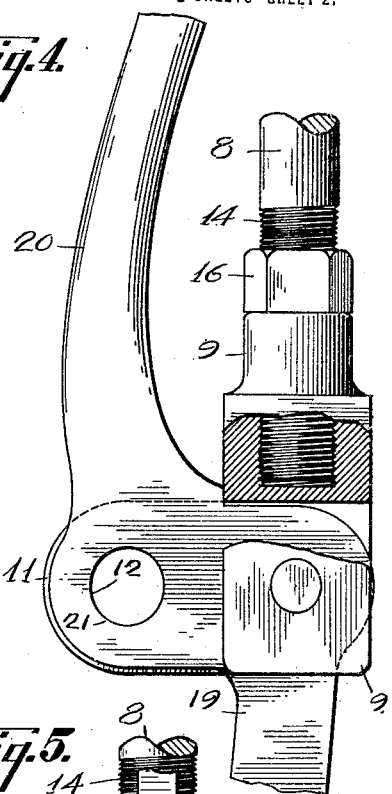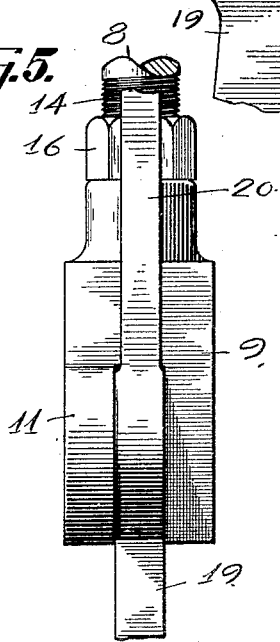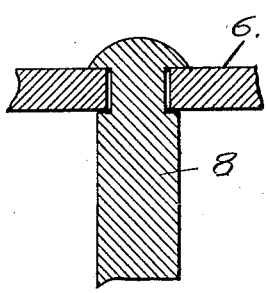

EUGENE S. MINER, OF SAN FRANCISCO, CALIFORNIA, ASSIGNOR OF ONE-HALF TO SIDNEY B. SARGEANT, OF SAN FRANCISCO, CALIFORNIA.

ATTACHMENT FOR TIRE CARRIERS.

1,411,742. Specification of Letters Patent. Patented Apr. 4, 1922.

Application filed March 29, 1921. Serial No. 456,722.

*To all whom it may concern:*

Be it known that I, EUGENE S. MINER, a citizen of the United States, residing in the city and county of San Francisco and State of California, have invented a new and useful Improvement in an Attachment for Tire Carriers, of which the following is a specification.

My invention relates to improvements in attachments for tire carriers for spare rims and tires of motor vehicles wherein an adjustable lever operates in conjunction with a tire carrier ring.

In the present state of the art several types of cars are manufactured with a single ring for carrying a single spare rim and tire mounted thereon with no means for preventing unauthorized removal of said spare rim and tire from said ring.

The present invention is for the purpose of providing a simple, cheap and efficient adjustable attachment arranged to be easily and readily attached to said single ring to provide means for carrying and locking a pair of rims and tires.

A further object of the invention is to provide a simple, cheap and effective attachment of the character described that may be easily and quickly operated to facilitate the removal and replacement of either one or two tires and rims on said carrier.

A still further object of the invention is to provide a simple, cheap and effective adjustable attachment whereby a pair of tires and rims may be held rigidly downwardly on their seats or carriers, said adjustable attachment providing varying degrees of pressure to provide for lost motion due to wear and usage of the device.

I accomplish these and other objects by means of the improved device disclosed in the drawings forming a part of the present specification, wherein like characters of reference are used to designate similar parts throughout the said specification and drawings, and in which—

Fig. 1 is a rear elevation of a tire carrier and tires disclosing my attachment applied thereto;

Fig. 2 is a plan view of Fig. 1 with the tires removed;

Fig. 3 is a vertical sectional view of Fig. 1 with the several parts disclosed in a closed or locking position in full lines, the dotted lines used to indicate the position of the several parts when a spare rim and tire is to be removed;

Fig. 4 is an enlarged broken view, partly in section, disclosing the adjustable and locking portion of the attachment;

Fig. 5 is a front elevation of Fig. 4; and

Fig. 6 is an enlarged broken sectional view disclosing the manner in which a portion of the attachment is movably and rotatably mounted.

Referring to the drawings the numeral 1 is used to designate a single tire carrier ring supported by means of suitable brackets 2 mounted upon a transverse member or rod 3 of the chassis, not shown.

A sector 4 is arranged parallel and in spaced relation with the upper portion of the ring 1 by means of suitable transverse straps 6 and suitable rim seats 7 are mounted adjacent the ends of said sector 4.

A vertically disposed rod 8 has the upper end thereof rotatably mounted within the approximate center of the center strap 6 in such a manner that the lower end of said rod 8 is capable of lateral movement, the purpose of which will hereinafter be more fully set forth.

A clevis 9, having a lug 11 provided with a locking aperture 12, is screwed upon the lower end of said rod 8 which is threaded to receive it, as at 14, and a lock nut 16 is screwed onto said threaded portion 14 and arranged to jam against said clevis 9.

A transverse shoe 17 has one end thereof pivotally connected, by means of a suitable bearing bracket 18, to the lower inner portion of the tire ring 1 while a lever 19, having a handle portion 20 and a locking aperture 21 therein arranged to register with the locking aperture 12 of the lug 11 on the clevis 9 when the several parts are in closed or locking position, is pivotally connected to said shoe 17.

A pair of spare rims and tires 22 and 23 respectively, are seated upon the ring 1 and seats 7 of the sector 4 as disclosed in Fig. 3 of the drawings.

By moving the lever 19, by means of its handle portion 20, into approximate alignment with the rod 8 the shoe 17 is actuated to engage the lower inner portions of the spare rims 22 and press the same downwardly to cause said rims to be firmly seated upon their respective supports, said locking apertures 12 and 21 of the lug 11 and lever 19 respectively registering when in such position.

In order to obtain rigid engagement of said shoe with the rims 22 the lock or jam nut 16 is backed away from the upper end of the clevis 9 and the rod 8 is rotated to move said clevis 9 to adjust pressure of the shoe 17 on the rims 22 after which the nut 16 is again jammed against the upper end of the clevis 9 to prevent further rotation of the rod 8.

By moving the handle portion 20 of the lever 19 away from the rod 8 the shoe 17 is raised to disengage the same from the spare rims 22 when the lower portions of said rims may be easily moved outwardly and then raised off of their respective supports.

The sector 4 with its straps 6 and seats 7, and also the rod 8, shoe 17 and lever 19 constitute the attachment.

In applying the same the inner ends of the straps 6 may be riveted or otherwise secured to the upper portion of the ring 1 and the bearing bracket 18 is similarly secured to the inner lower portion of the said ring 1.

By means of this simple, cheap and easily applied attachment, the single tire carrier constituting a single ring, is increased in capacity to hold two spare tires in such a manner that said tires and their rims may be easily and quickly removed and replaced, and as quickly and easily locked in position by moving the lever 19 in alignment with the rod 8 to depress the shoe 17 onto the lower portions of said rims 22 and simultaneously register the locking apertures 12 and 21 to receive a suitable lock 26 to retain said attachment in engaging position and thereby prevent unauthorized removal of the spare tires.

The simplicity of construction and operation, together with the very few parts required, renders an economical and efficient tire carrier arranged to rigidly support and carry two tires and from which said tires may be easily and quickly removed or upon which said tires may be replaced.

The adjustability provided by the threaded portion 14 of the rod 8 and the threaded clevis 9 thereon provides a means whereby said attachment may be easily, quickly and effectively adjusted to rims of various types, and also, whereby said shoe may be adjusted to take up lost motion occasioned through wear and usage.

Having thus described my invention, what I claim as new and desire to secure by Letters Patent is:

1. The combination with a single tire carrier ring of a sector connected parallel to and in spaced relation with the upper portion of said ring; a vertically disposed rod having its upper end rotatably and loosely connected to the ring and sector and having the lower end thereof threaded; a transverse shoe pivotally mounted upon the lower portion of said ring and arranged to engage and depress rims supported by said ring and sector; a clevis screw threaded upon the lower end of the rod; and a lever pivotally connected to said rod and shoe and arranged to move the shoe to engage and disengage said rims to rigidly hold the same on their respective supports.

2. The combination with a single tire carrier ring of a sector connected parallel to and in spaced relation with the upper portion of said ring; a transverse shoe pivotally mounted upon the lower portion of said ring and arranged to engage the lower portions of rims mounted upon said ring and sector; a vertically disposed rod having its upper end rotatably and loosely connected to the ring and sector and having the lower end thereof threaded; a clevis screw threaded upon said lower end of said rod having a locking aperture therein; and a lever pivotally connected to said shoe and clevis and arranged to move the shoe to engage and disengage the lower portion of rims on said sector and ring and having a locking aperture arranged to register with the locking aperture of the clevis when said lever is positioned to move the shoe to engage the rims.

3. The combination with a single tire carrier ring of a sector connected parallel to and in spaced relation with the upper portion of said ring; a transverse shoe pivotally mounted upon the lower portion of said ring and arranged to engage the lower portions of rims mounted upon said ring and sector; a vertically disposed rod having its upper end rotatably and loosely connected to the ring and sector and having the lower end thereof threaded; a clevis screw threaded upon said lower end of said rod having a locking aperture therein; a lever pivotally connected to said shoe and clevis and arranged to move the shoe to engage and disengage the lower portion of rims on said sector and ring and having a locking aperture arranged to register with the locking aperture of the clevis when said lever is positioned to move the shoe to engage the rims; and means for preventing rotation of the rod relatively to the clevis.

4. The combination with a single tire carrier ring of a sector connected parallel to and in spaced relation with the upper portion of the ring; a laterally disposed strap secured between the sector and the ring at the top thereof, said strap having a centrally disposed aperture therein; a vertically disposed rod having a reduced portion at its upper end arranged to enter and be engaged by the aperture in the strap and to form a shoulder to bear against said strap; means for loosely and rotatably securing the reduced portion of the rod in engagement with the aperture; a transverse shoe pivotally mounted upon the lower portion of the ring and arranged to engage and depress rims supported by said ring and sector; a clevis threaded upon the lower end of the rod; and a lever pivotally connected to said rod and shoe and arranged to move the shoe to engage and disengage said rims to rigidly hold the same on their respective supports.

In witness whereof I hereunto set my signature.

EUGENE S. MINER.